July 7, 1964  H. D. SULLIVAN ET AL  3,139,969
AGRICULTURAL APPARATUS
Filed Sept. 26, 1962  2 Sheets-Sheet 1

INVENTORS.
Herbert D. Sullivan
Homer N. Grillot

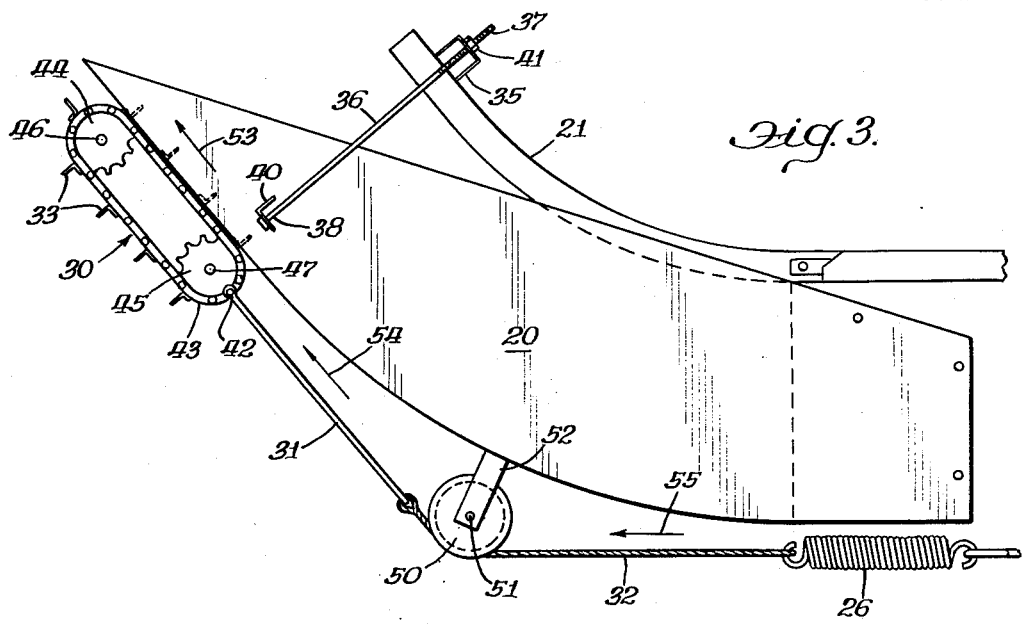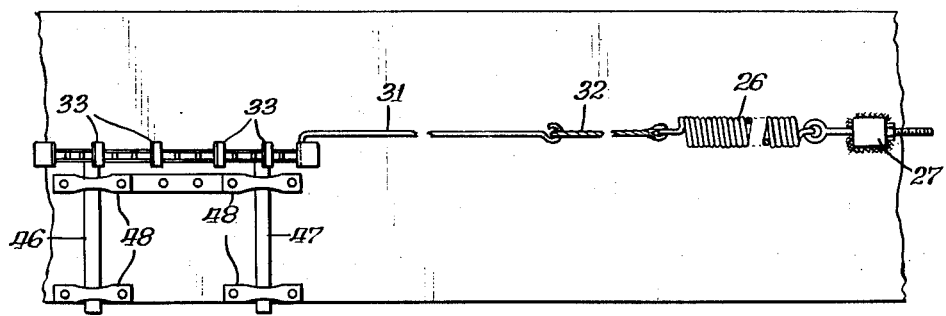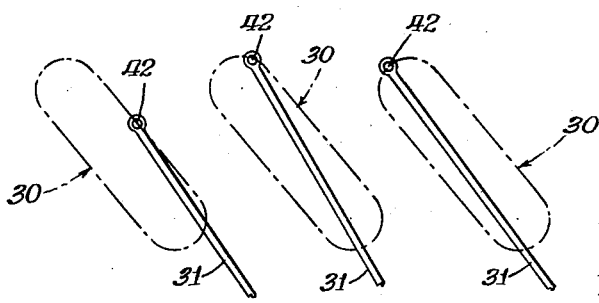

United States Patent Office 3,139,969
Patented July 7, 1964

3,139,969
AGRICULTURAL APPARATUS
Herbert D. Sullivan, Memphis, Tenn., and Homer N. Grillot, Naperville, Ill., assignors to International Harvester Company, Chicago, Ill., a corporation of New Jersey
Filed Sept. 26, 1962, Ser. No. 226,275
6 Claims. (Cl. 198—128)

This invention is directed to a bale thrower or impeller apparatus, and more particularly to such an apparatus in which the energy required for the throwing operation is derived from the movement of the formed bales from the bale-throwing chamber into and through the discharge chute of a conventional baler.

In the considerable efforts to automate as many agricultural operations as feasible, significant attention has been given to hay handling methods and equipment. A major stride was made when the hay handling operation was taken from the completely manual status and hay balers became sufficiently reliable to both pick-up and tie the hay bales as the baler was pulled through the field. Initially the bales were merely dropped behind the baler, for subsequent pick-up and deposit in the wagon by manual means. Some of this labor was eventually eliminated, by providing a bale discharge chute leading from the rear end of the baler rearwardly and slightly upwardly so that the bales would be forced onto a wagon or attached trailer, where they were still manually handled inasmuch as they must still be raised and stacked.

A considerable advance in this art was achieved by the introduction and commercial acceptance of bale throwers. In such units energy is derived either from another source, that is, one provided with the bale thrower, or taken from the hay baler or tractor, and utilized to apply a large force to the bale over a short time duration, thereby impelling a bale upwardly and rearwardly for receipt in a suitable trailing depository such as a wagon or trailer. With random stacking of the bales thus "thrown" by machine, only one man, the tractor operator, is required to effect the operations of picking up the hay, having it baled and thrown into the wagon for subsequent discharge at a barn or other storage location.

While this method has proved a considerable advance over the former all-manual loading operations, it is still desirable to improve the described bale-throwing operation and to minimize the expense required in providing the extra power requisite to effect the bale throwing upwardly and rearwardly into a wagon.

It is therefore a primary object of the present invention to provide a bale-throwing apparatus which does not require an independent power source or power transfer from another mechanism, such as the baler.

A corollary object of the invention is the provision of such an apparatus in which the power required to throw the bale is supplied from some force or movement already present in conventional baler units.

Bearing in mind that the principles of the invention are applicable to material-handling systems in general as well as bale-throwing units in particular, the foregoing and other objects of the invention are realized in a preferred embodiment which is constructed in a material-handling system including a feeding channel into which articles are fed at a relatively constant input speed. In accordance with the present invention, energy storage means is provided, and likewise energy transfer means is provided, the energy transfer means being positioned at least partly in the channel and being coupled to the energy storage means. The energy transfer means is operative to transfer from a moving article to the energy storage means for a first time period as the energy transfer means is displaced by articles fed into and through the channel. Thereafter the energy transfer means is operative to release the stored energy during a second time period substantially shorter than the first period, thereby imparting an output speed or impelling velocity to an article which is substantially greater than the input speed at which the articles are fed into the channel.

The best mode contemplated for carrying out the invention will now be described. To enable those skilled in the art to make and use the invention, such description is set forth in connection with the accompanying drawings, in the several figures of which like reference numerals identify like elements, and in which:

FIGURE 3 is a partial side view, taken on a scale enlarged with respect to that of FIGURES 1 and 2, and particularly illustrating the inventive structure as mounted at the rear of the baler;

FIGURE 4 is a schematic illustration depicting the various components of this embodiment of the inventive structure; and FIGURES 5A, 5B and 5C are illustrative representations useful in understanding the operation of the invention.

*Structure of the Invention*

Figure 1:
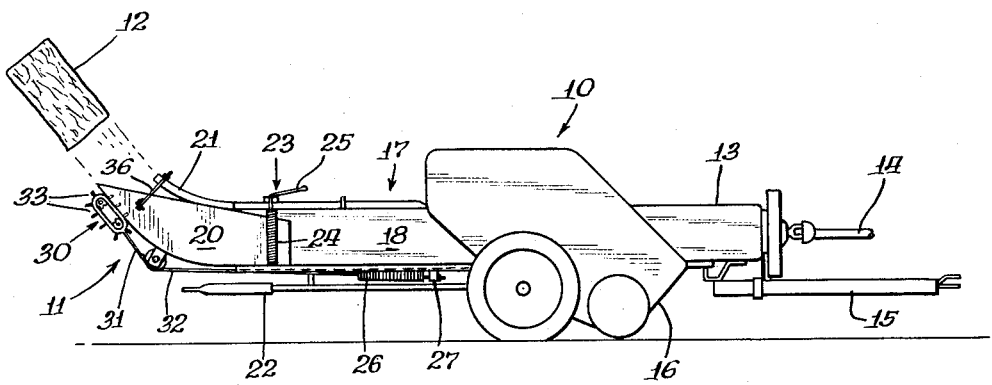

In FIGURE 1 a conventional baler arrangement 10 is depicted, and a novel bale-throwing arrangement 11 is shown affixed thereto at the lower rear portion of the bale delivery chute. A finished and tied bale 12 is shown in the initial portion of its trajectory after receiving impetus from the bale-thrower unit 11 in its delivery toward a suitable depository (not shown).

The baler 10 comprises a front housing 13 in which components, not visible in this view, are mounted to reciprocate and deliver the necessary compressive force to compact the hay. Energy for this operation is received over a shaft 14, normally coupled to the power take-off shaft (not shown) of the associated draft implement such as a tractor. In addition to receiving the energy from such source, a tongue member 15 is provided so that the baler can receive tractive force and direction from the pulling implement. Hay is picked up at a lower central portion 16 of the baler, and after being compacted and tied into bales, is displaced rearwardly through a bale-delivery chute 17, one side panel 18 of which is visible in FIGURE 1.

Figure 2:
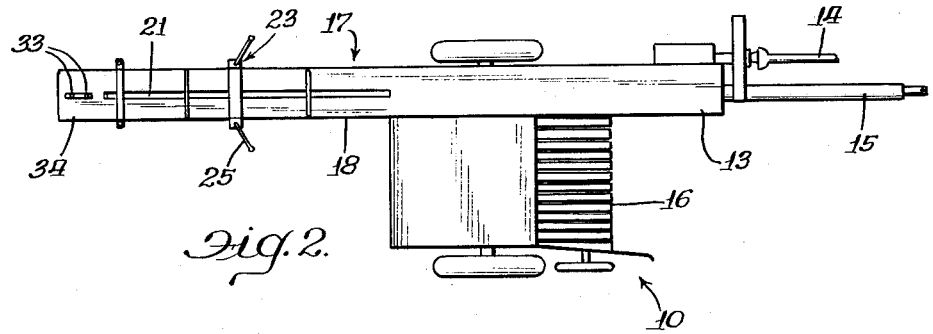
FIGURES 1 and 2 are side and plan views respectively, of a conventional baler to which an embodiment of the present invention has been added.

Behind the bale delivery chute is a bale deflecting unit including a pair of side panels, of which side panel 20 is shown, and an upper guide member 21. Another tongue member 22 is provided beneath the baler for attachment to the trailing depository, such as a wagon, to receive the bales as thrown by unit 11. Another conventional unit depicted in FIGURE 2 is an adjusting means 23 for regulating the compression in the bale discharge chute 17. Such means may comprise a spring, such as a spring 24 at each side of the delivery chute, and an adjusting means such as handle 25 for effecting a desired variation in the forces applied to maintain the alignment of the top and bottom portions of channel 17.

In accordance with the inventive teaching, a bale thrower arrangement 11 is affixed to the lower rear portion of the baler. The thrower apparatus comprises an energy storage means, which in this embodiment includes a spring mmeber 26 having one end coupled to a bracket 27 affixed to the underside of the bale delivery channel. The throwing apparatus further comprises an energy translation means, which in this embodiment comprises both an actuator means 30 and a linkage means including a relatively rigid component 31 and a flexible component 32, for intercoupling the actuator means 30 and the energy storage means 26. A plurality of teeth or lugs 33 are affixed to actuator 30 for operation in a manner to be explained hereinafter. It is noted that at least along a portion of actuator 30, lugs 33 extend through a slot provided in the lower wall 34 of the bale guiding unit at the rear of channel 17. The extension of such lugs into the slot is better seen in FIGURE 2, in which other conventional components of the baler are also shown.

In FIGURE 3 the arcuate guide member 21 includes a bracket member 35 affixed to the end thereof. An adjusting member 36, which may comprise a rod with a threaded portion 37, has its threaded portion inserted through bracket 35 and its other end portion 38 fastened to a suitable bracket 40 attached to the side of side plate 20 by welding or other suitable means. Variation of the position of nut 41 on the threaded portion 37 of member 36 is thus effective to vary the position of guide member 21 with respect to the bale directing portion at the rear of the delivery chamber.

One end of the energy storage means or spring 26 is coupled over flexible link means, shown as a line or cord 32, to a rigid link member 31, shown as a bar having one end hooked through an eye portion of flexible line 32 and the other end affixed as by a bolt or cotter 42 to a chain 43, indexed as indicated over sprockets 44 and 45. The sprockets 44 and 45 are respectively affixed to shafts 46 and 47, supported in a plurality of bearing blocks 48 in turn affixed to the underside of the chute as indicated generally in FIGURE 4. In the showing of FIGURE 3, the novel bale throwing apparatus is at rest and no energy is stored in the spring 26. The manner in which energy is transferred thereto over a first period of given duration and subsequently removed therefrom in a second and much shorter period will now be described. As used herein and in the appended claims, "period" refers to time duration and "interval" describes a distance measurement.

*Operation of the Invention*

As the baler is pulled through a field and hay is picked up, formed and tied into bales, the first finished bale is passed rearwardly through the delivery chute 17 depicted in FIGURES 1 and 2 and eventually arrives at the rear of the chute, in whcih it is deflected upwardly by the lower rear portion of the bale delivery channel, as indicated in FIGURE 3. As the edge of the bale farthest from the bale chamber engages the first one of the teeth or lugs 33 on the chain 43, that is, the lug 33 nearest bracket 40 in FIGURE 3, the lug is displaced in the direction indicated by arrow 53 causing a corresponding displacement of chain 43. Responsive to such displacement of the chain around sprockets 44 and 45, the connection of bar 31 at 42 moves along the path of the chain and effects a displacement of the bar in the direction depicted by arrow 34. The direction of this translation is applied to flexible line 32, and this direction is varied around a portion of the periphery of pulley 50, journalled on a shaft 51 supported by brackets 52 as shown. The main portion of flexible line 32 moves as indicated by arrow 55, and causes a stretching of the energy storage means 26 as energy is stored therein. This movement continues, and when the first lug thus engaged has been displaced about half-way along the working run of the chain, the rigid link 31 is in the position depicted in FIGURE 5A. As bar 31 reaches the position indicated in FIGURE 5B, energy still is being transferred over the actuator means 30 and the linkage arrangement including the rigid link 31 and flexible link 32 to the storage means 26. Shortly thereafter continued engagement of subsequent lugs by the bale effects the displacement of bar 31 to the position indicated in FIGURE 5C, where the end of the bar 31 farthest from pulley 50 has gone slightly over-center with respect to the other end of the bar, and therefore a tensile force is no longer applied over the linkage to the storaeg means at this moment. Accordingly, the force exerted by spring 26 rapidly returns flexible link 32 and the rigid link 31 in directions opposite to those referenced by arrows 55 and 54, and causes a swift return of link 31 from the position indicated in FIGURE 5C to the at-rest position indicated in FIGURE 3. Such rapid rotation of the chain causes a rapid movement of the fingers 31 which bite into the underside of the bale and impart a velocity to the bale substantially greater than the input velocity or the velocity at which the bales are pushed from the bale chamber. This high velocity applied over a short period is sufficient to impel or throw the bale upwardly and rearwardly, through a trajectory suitable to deposit the bale into the trailing wagon.

It is thus evident that the invention provides a substantial advance in the art by affording a bale thrower apparatus which does not require either an independent engine or a separate power take-off arrangement from the baler. Instead, actuator means is partially interposed in the bale discharge channel for displacement by the bale being moved outwardly from the chamber at a relatively low and constant velocity. This displacement of an actuator is translated, in the illustrated embodiment, over a linkage arrangement to an energy storage means, which may be a coil spring such as that depicted. Release of the energy is effected automatically as the rigid link 31 goes overcenter after the chain 43 has rotated through slightly more than half its entire path of travel. As the end of link 31 goes overcenter, the energy is rapidly returned from the storage means 26 to the actuator 30, thereby impelling the bale rapidly upwardly and rearwardly from the bale discharge chute. The invention is simple in structure and fabrication, and substantially reduces the motive or engine power required in impelling a hay bale from the baler to the trailing wagon.

While only a particular embodiment of the invention has been described and illustrated, it is apparent that modifications and alterations may be made therein. It is therefore the intention in the appended claims to cover all such modifications and/or alterations as may fall within the true spirit and scope of the invention.

What is claimed is:

1. In a system for directing articles along a predetermined path including channel means for receiving said articles at a relatively constant input velocity, energy storage means, actuator means positioned adjacent said channel and including at least a portion extending into said channel for displacement by one of said articles at said relatively constant velocity, and linkage means intercoupling said actuator means and said energy storage means, whereby energy is transferred to said energy storage means during a first period in which said actuator is displaced at said relatively constant velocity, said actuator being operative upon displacement to a preassigned position to effect release of the energy from said energy storage means and impel one of said articles at an output velocity substantially higher than said input velocity.

2. For use in conjunction with a hay baler having a discharge channel through which the formed and tied bales are pushed at a given speed, energy storage means affixed to said baler, actuator means affixed to said baler and including at least a movable portion extending into said channel for displacement by one of said bales at said given speed, and linkage means intercoupling said actuator means and said energy storage means, whereby said one bale effects displacement of said actuator and consequent storage of energy in said energy storage means over a first period, and responsive to displacement of said actuator to a predetermined position, the stored energy is released from said energy storage means and said bale is impelled upwardly and rearwardly with respect to the baler at an output speed substantially greater than said given speed.

3. For use with a material-handling system in which objects are passed through a given channel at a substantially constant velocity, energy storage means comprising a spring, actuator means including a chain flight journaled for movement adjacent said channel, finger members affixed to said chain and extending at least partially into said channel, whereby an object moving through the channel at said constant velocity engages said finger members and effects displacement of the chain, and a linkage intercoupling said chain and said spring, whereby movement of the chain effects storage of energy in said spring until the chain reaches a preassigned point at which the stored energy is rapidly released from said spring and said chain is rapidly driven to impart a substantially enhanced velocity to one of said objects.

4. For use with a hay baler having a bale discharge channel in which bales are displaced at a given velocity, a bale throwing apparatus comprising actuator means including a pair of indexing elements, a flexible member journaled over said pair of indexing elements for movement adjacent said channel, a plurality of bale engaging fingers affixed to said flexible member for engagement by and displacement with one of the bales in the discharge channel, energy storage means, and linkage means including a first substantially rigid element having one end portion coupled to said flexible actuator member, and further including a second flexible element intercoupling said substantially rigid element and said energy storage means, whereby movement of said flexible actuator member from a given at-rest point to an over-center point is effective to transfer energy to said energy storage means, and movement of the flexible actuator member past said overcenter point is effective to produce a rapid release of the energy from said energy storage means, thereby imparting a velocity substantially greater than said given velocity to the one of said bales which initially effected the storage of energy.

5. In a material-handling channel in which similar articles are delivered into a discharge channel at a relatively constant speed, a fixed member, a spring coupled to said fixed member, a pair of sprockets, means supporting said sprockets in spaced-apart relation, a chain member indexed around said sprockets and positioned adjacent said channel, a plurality of lugs affixed to said chain at intervals, at least some of said lugs extending into said channel, a rigid link coupled to said chain member for movement therewith, and a flexible link intercoupled between said rigid link and said spring, whereby movement of an article into engagement with one of said lugs is effective to displace said chain and store energy in said spring until the rigid link goes overcenter, and thereafter energy stored in the spring is rapidly released to impart to one of said articles a speed substantially higher than said constant speed.

6. For use with a hay baler having a discharge chute for directing formed bales along a predetermined route at a substantially constant velocity, guide means including a curvilinear channel affixed to the end of said discharge chute for orienting the bales at a desired inclination with respect to the ground line, a fixed reference location, a spring coupled to said fixed reference location, a support, a pair of sprockets spaced apart on said support for rotation adjacent said curvilinear channel, a flexible chain indexed around said sprockets, a plurality of fingers on said chain and extending at right angles thereto, at least some of said fingers extending through said curvilinear channel for engaging a formed bale, a rigid link coupled to a given point on said chain for movement therewith, and a flexible link intercoupled between said rigid link and said spring, whereby movement of a bale along said curvilinear channel is effective both to displace said chain and to store energy in said spring, and responsive to said rigid link going overcenter, the energy stored in the spring is swiftly released and a significantly higher velocity is imparted to said chain, the higher velocity being, in turn, imparted to the bale in the curvilinear guide channel.

References Cited in the file of this patent
FOREIGN PATENTS
977,277    France _____ Mar. 29, 1951